(12) United States Patent
Yang et al.

(10) Patent No.: US 12,004,212 B2
(45) Date of Patent: Jun. 4, 2024

(54) UCI MULTIPLEXING ON CONFIGURED GRANT PUSCH

(71) Applicant: QUALCOMM Incorporated, San Diego, CA (US)

(72) Inventors: Wei Yang, San Diego, CA (US); Yi Huang, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/448,314

(22) Filed: Sep. 21, 2021

(65) Prior Publication Data

US 2022/0104210 A1 Mar. 31, 2022

Related U.S. Application Data

(60) Provisional application No. 63/083,746, filed on Sep. 25, 2020.

(51) Int. Cl.
| | |
|---|---|
| *H04L 5/00* | (2006.01) |
| *H04W 72/1263* | (2023.01) |
| *H04W 72/21* | (2023.01) |
| *H04W 72/23* | (2023.01) |
| *H04W 72/56* | (2023.01) |

(52) U.S. Cl.
CPC ....... *H04W 72/56* (2023.01); *H04W 72/1263* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | |
|---|---|---|---|
| 10,530,528 B2 * | 1/2020 | Park | H04L 5/00 |
| 11,470,626 B2 * | 10/2022 | Takeda | H04W 72/1268 |
| 11,510,228 B2 * | 11/2022 | Yang | H04L 1/0003 |

(Continued)

OTHER PUBLICATIONS

International Search Report and Written Opinion—PCT/US2021/071551—ISA/EPO—dated Dec. 23, 2021.

(Continued)

*Primary Examiner* — Sithu Ko
(74) *Attorney, Agent, or Firm* — Norton Rose Fullbright US LLP

(57) ABSTRACT

Systems and method for configuring and providing uplink control information (UCI) multiplexing on physical uplink shared channel (PUSCH) transmissions are disclosed. In embodiments, a base station configures and signals, to a user equipment (UE) a plurality of sets of beta-offset values to be used by the UE for multiplexing a UCI transmission of a first priority to a PUSCH transmission of a second priority. Each set of the plurality of sets of beta-offset values is configured based on the second priority of the PUSCH transmission. In embodiments, the UE determines whether the UCI transmission of the first priority is allowed to be multiplexed to the PUSCH transmission of the second priority, and multiplexes the UCI to the PUSCH when multiplexing of the UCI and PUSCH is allowed, using a beta-offset value from the plurality of sets of beta-offset values. Other aspects and features are also claimed and described.

30 Claims, 8 Drawing Sheets

(56) References Cited

U.S. PATENT DOCUMENTS

| | | | |
|---|---|---|---|
| 11,791,949 B2* | 10/2023 | Yang | H04L 5/0044 |
| | | | 370/329 |
| 11,831,578 B2* | 11/2023 | Wang | H04L 5/0057 |
| 2020/0305147 A1 | 9/2020 | Lee et al. | |
| 2020/0374917 A1* | 11/2020 | Takeda | H04L 5/0053 |
| 2021/0168794 A1* | 6/2021 | Zhang | H04L 1/1671 |
| 2022/0183025 A1* | 6/2022 | Fröberg Olsson | H04L 1/0042 |
| 2023/0189273 A1* | 6/2023 | Fu | H04L 5/0064 |
| | | | 370/329 |

OTHER PUBLICATIONS

Moderator (OPPO): "Summary#1 on Intra-UE Multiplexing/Prioritization for R17", 3GPP Draft, R1-2007055, 3GPP TSG RAN WG1 #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 25, 2020 (Aug. 25, 2020), XP051921419, 13 Pages, Retrieved from the Internet: URL:https://ftp.3gpp.org/tsg_ran/WG1_RL1/TSGR1_102-e/Docs/R1-2007055.zip R1-2007055.doc [retrieved on Aug. 25, 2020] Section 2.

* cited by examiner

| 1a | 1b | 1c | 1d | 1e | 1f | 1g |
|----|----|----|----|----|----|----|
| 2a | 2b | 2c | 2d | 2e | 2f | 2g |
| 3a | 3b | 3c | 3d | 3e | 3f | 3g |
| 4a | 4b | 4c | 4d | 4e | 4f | 4g |

| 1a | 1b | 1c | 1d | 1e | 1f | 1g |
|----|----|----|----|----|----|----|
| 2a | 2b | 2c | 2d | 2e | 2f | 2g |
| 3a | 3b | 3c | 3d | 3e | 3f | 3g |
| 4a | 4b | 4c | 4d | 4e | 4f | 4g |

| 1a | 1b | 1c | 1d | 1e | 1f | 1g |
|----|----|----|----|----|----|----|
| 2a | 2b | 2c | 2d | 2e | 2f | 2g |
| 3a | 3b | 3c | 3d | 3e | 3f | 3g |
| 4a | 4b | 4c | 4d | 4e | 4f | 4g |

| 1a | 1b | 1c | 1d | 1e | 1f | 1g |
|----|----|----|----|----|----|----|
| 2a | 2b | 2c | 2d | 2e | 2f | 2g |
| 3a | 3b | 3c | 3d | 3e | 3f | 3g |
| 4a | 4b | 4c | 4d | 4e | 4f | 4g | ary, to uplink control information (UCI) transmissions. Certain embodiments of the technology discussed below can enable and provide UCI multiplexing on physical uplink shared channel (PUSCH) transmissions.

UCI MULTIPLEXING ON CONFIGURED GRANT PUSCH

CROSS-REFERENCE TO RELATED APPLICATIONS

This application claims the benefit of U.S. Provisional Patent Application No. 63/083,746, entitled, "UCI MULTIPLEXING ON CONFIGURED GRANT PUSCH," filed on Sep. 25, 2020, which is expressly incorporated by reference herein in its entirety.

TECHNICAL FIELD

Aspects of the present disclosure relate generally to wireless communication systems, and more particularly, to uplink control information (UCI) transmissions. Certain embodiments of the technology discussed below can enable and provide UCI multiplexing on physical uplink shared channel (PUSCH) transmissions.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, by a UE, whether an UCI transmission of a first priority is allowed to be multiplexed to a PUSCH transmission of a second priority, and multiplexing, in accordance with a determination that the UCI transmission of the first priority is allowed to be multiplexed to the PUSCH transmission of the second priority, the UCI transmission of the first priority to the PUSCH transmission of the second priority. In embodiments, multiplexing the UCI transmission of the first priority to the PUSCH transmission of the second priority may include selecting a beta offset value from a plurality of sets of beta-offset values configured by a base station, each set of the plurality of sets of beta-offset values configured based at least in part on the second priority of the PUSCH transmission.

In an additional aspect of the disclosure, a method of wireless communication includes configuring, by a base station, a plurality of sets of beta-offset values to be used by a UE for multiplexing UCI transmission of a first priority transmission to PUSCH transmission of a second priority. In embodiments, each set of the plurality of sets of beta-offset values is configured based at least in part on the second priority of the PUSCH transmission. The method further includes signaling the plurality of sets of beta-offset values to the UE.

In an additional aspect of the disclosure, an apparatus configured for wireless communication includes means for determining, by a UE, whether an UCI transmission of a first priority is allowed to be multiplexed to a PUSCH transmission of a second priority, and means for multiplexing, in accordance with a determination that the UCI transmission of the first priority is allowed to be multiplexed to the PUSCH transmission of the second priority, the UCI transmission of the first priority to the PUSCH transmission of the second priority. In embodiments, multiplexing the UCI transmission of the first priority to the PUSCH transmission of the second priority may include selecting a beta offset value from a plurality of sets of beta-offset values configured by a base station, each set of the plurality of sets of beta-offset values configured based at least in part on the second priority of the PUSCH transmission.

In an additional aspect of the disclosure, an apparatus configured for wireless communication includes means for configuring, by a base station, a plurality of sets of beta-offset values to be used by a UE for multiplexing UCI transmission of a first priority transmission to PUSCH transmission of a second priority. In embodiments, each set of the plurality of sets of beta-offset values is configured based at least in part on the second priority of the PUSCH transmission. The apparatus further includes means for signaling the plurality of sets of beta-offset values to the UE.

In an additional aspect of the disclosure, a non-transitory computer-readable medium having program code recorded thereon. The program code further includes code to determine, by a UE, whether an UCI transmission of a first priority is allowed to be multiplexed to a PUSCH transmission of a second priority, and to multiplex, in accordance with a determination that the UCI transmission of the first priority is allowed to be multiplexed to the PUSCH transmission of the second priority, the UCI transmission of the first priority to the PUSCH transmission of the second priority. In embodiments, the means for multiplexing the UCI transmission of the first priority to the PUSCH transmission of the second priority may include means for selecting a beta offset value from a plurality of sets of beta-offset values configured by a base station, each set of the plurality of sets of beta-offset values configured based at least in part on the second priority of the PUSCH transmission.

In an additional aspect of the disclosure, a non-transitory computer-readable medium having program code recorded thereon. The program code includes code to configure, by a base station, a plurality of sets of beta-offset values to be used by a UE for multiplexing UCI transmission of a first priority transmission to PUSCH transmission of a second priority. In embodiments, each set of the plurality of sets of beta-offset values is configured based at least in part on the second priority of the PUSCH transmission. The program code further includes code to signal the plurality of sets of beta-offset values to the UE.

In an additional aspect of the disclosure, an apparatus configured for wireless communication is disclosed. The apparatus includes at least one processor, and a memory coupled to the processor. The processor is configured to determine, by a UE, whether an UCI transmission of a first priority is allowed to be multiplexed to a PUSCH transmission of a second priority, and to multiplex, in accordance with a determination that the UCI transmission of the first priority is allowed to be multiplexed to the PUSCH transmission of the second priority, the UCI transmission of the first priority to the PUSCH transmission of the second priority. In embodiments, the means for multiplexing the UCI transmission of the first priority to the PUSCH transmission of the second priority may include means for selecting a beta offset value from a plurality of sets of beta-offset values configured by a base station, each set of the plurality of sets of beta-offset values configured based at least in part on the second priority of the PUSCH transmission.

In an additional aspect of the disclosure, an apparatus configured for wireless communication is disclosed. The apparatus includes at least one processor, and a memory coupled to the processor. The processor is configured to configure, by a base station, a plurality of sets of beta-offset values to be used by a UE for multiplexing UCI transmission of a first priority transmission to PUSCH transmission of a second priority. In embodiments, each set of the plurality of sets of beta-offset values is configured based at least in part on the second priority of the PUSCH transmission. The processor is further configured to signal the plurality of sets of beta-offset values to the UE Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4B-4E illustrate examples of pluralities of sets of beta-offset values that may be configured by the base station for use by the UE in multiplexing operations in accordance with aspects of the present disclosure.

DETAILED DESCRIPTION

Figure 1:
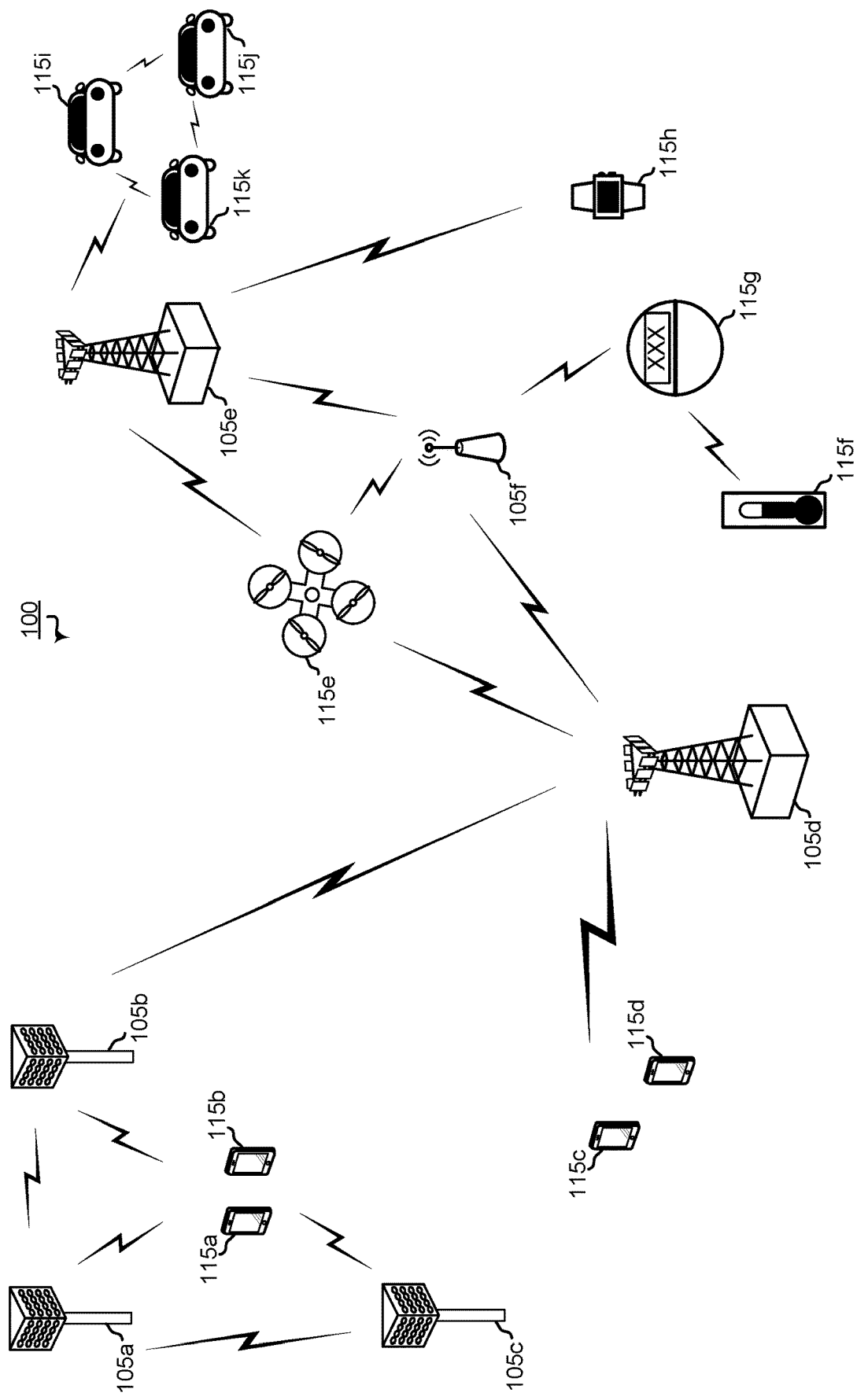
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
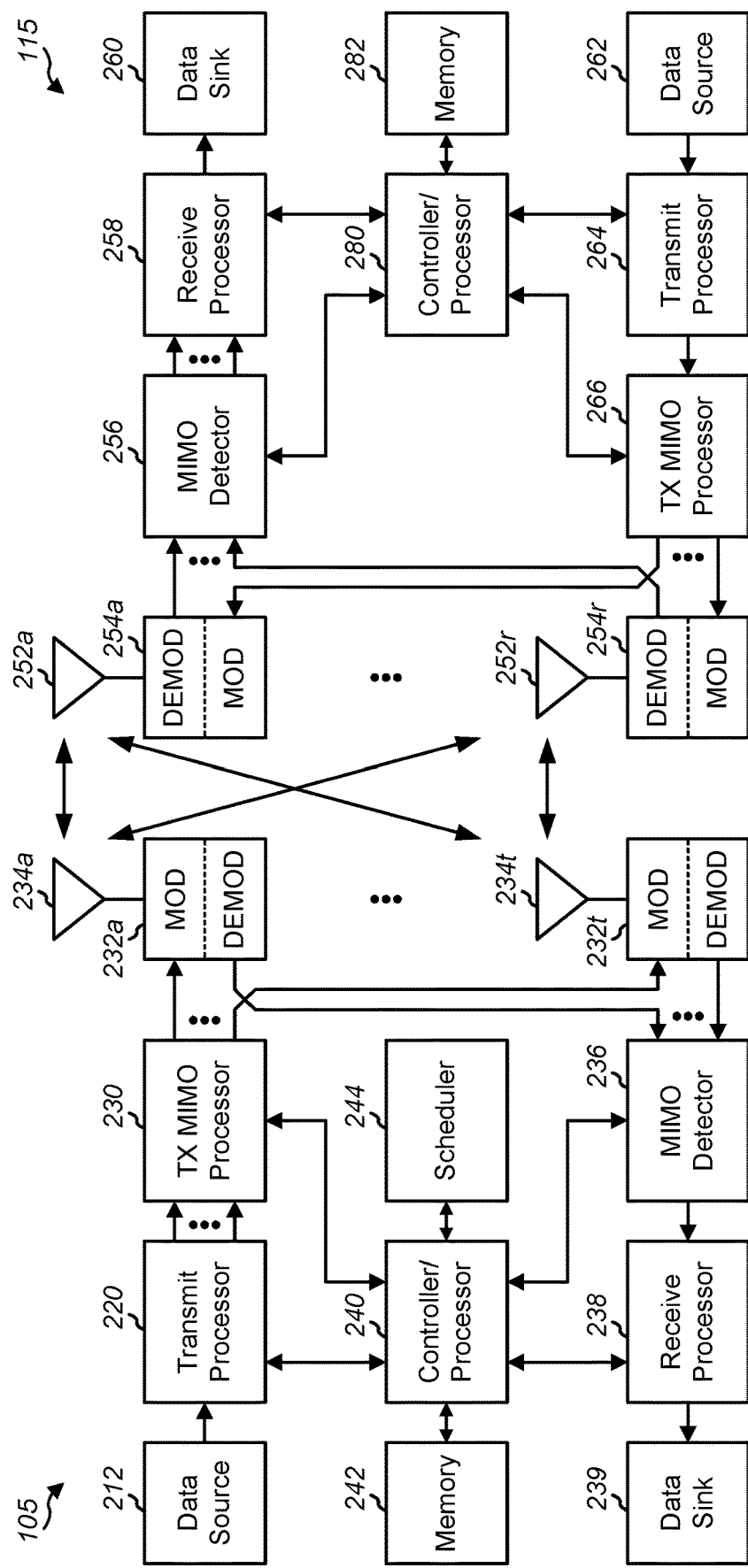
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115.

Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Some wireless communications systems implement communications using two priority levels for uplink traffic, such as in the physical layer, in order to distinguish between enhanced Mobile Broadband (eMBB) traffic and Ultra-reliable low-latency communication (URLLC) traffic. In particular a low priority and high priority designation are used in these systems. In some cases, uplink traffic is designated as high priority traffic or as low priority traffic. The priority designation of the uplink traffic may depend on the type of uplink traffic. For example, in some cases UCI traffic may be designated as high priority UCI traffic or may be designated as low priority UCI traffic. Similarly, in some cases a PUSCH transmission may be designated as low priority or as high priority. In some embodiments, the priority of a particular uplink transmission, or type of uplink transmission, (e.g., a UCI transmission or a PUSCH transmission) may be configured by the base station, and the priority configuration may be signaled to a UE (e.g., in a transmission grant). The UE may use the configuration to determine the priority of a scheduled uplink transmission (e.g., a UCI transmission or a PUSCH transmission).

Figure 3:
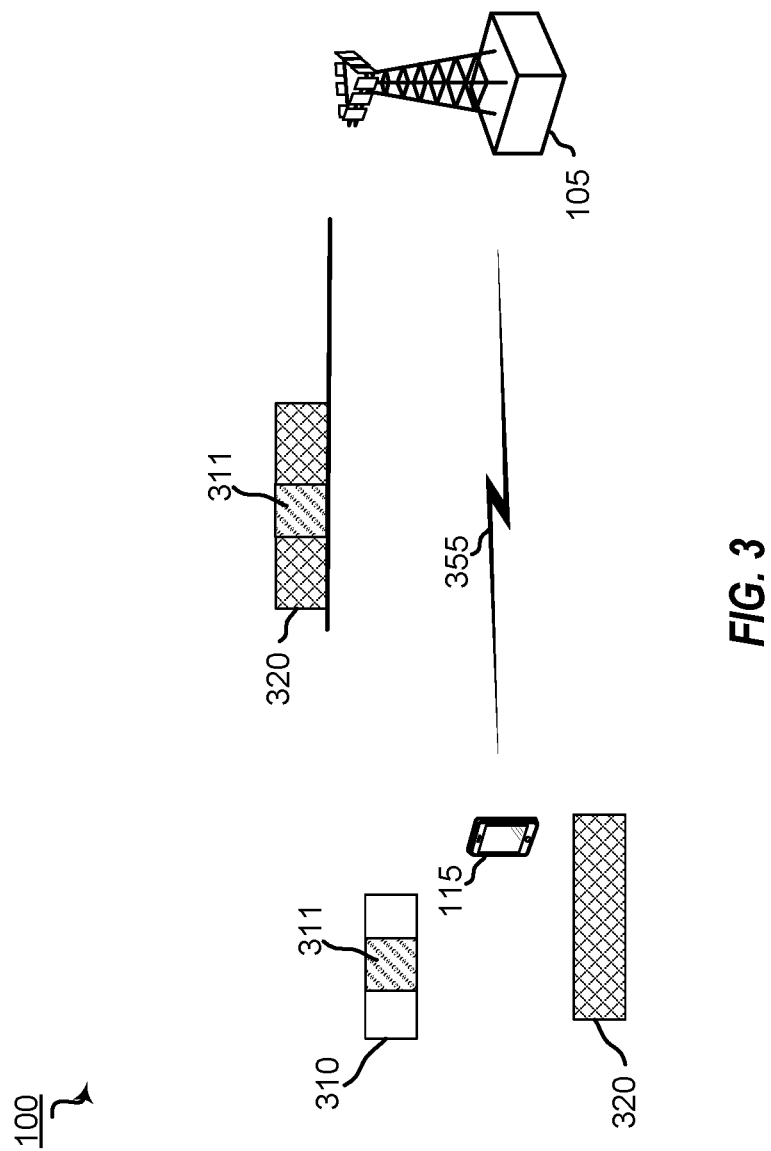
FIG. 3 is a diagram illustrating multiplexing operations of a UCI onto a PUSCH transmission.

In some implementations of a wireless communication system, when a PUCCH transmission (e.g., a PUCCH transmission carrying UCI) overlaps (e.g., in the time domain) with a PUSCH transmission, the PUCCH transmission may be dropped and the UCI in the PUCCH may be multiplexed to the PUSCH transmission. In this case, the UCI may be transmitted along with the uplink shared channel (UL-SCH) in the PUSCH transmission. FIG. 3 is a diagram illustrating multiplexing operations of a UCI onto a PUSCH transmission. In the particular example illustrated in FIG. 3, UE 115 may be scheduled to transmit PUCCH 310 which includes UCI 311, and PUSCH 320 to base station 105. In this example, the transmissions of PUCCH 310 and PUSCH 320 may overlap in the time domain. In implementations, in response to PUCCH 310 and PUSCH 320 overlapping, PUCCH 310 may be dropped and PUSCH 320 may be transmitted. In this case, UCI 311, which was scheduled to be transmitted in PUCCH 310, may be multiplexed to PUSCH 320 and may be transmitted along with the UL-SCH.

However, in current implementations, multiplexing of the UCI to the PUSCH may only be permitted when the priority of the UCI and the priority of the PUSCH are the same. In these implementations, multiplexing of the UCI to the PUSCH is not permitted when the priority of the UCI and the priority of the PUSCH are different. Indeed, when the priority of the UCI and the priority of the PUSCH are different, the transmitting UE may drop the low priority transmission and may only transmit the high priority transmission. For example, a low priority UCI may not be multiplexed to a high priority PUSCH. Instead, the low priority UCI may be dropped and the high priority PUSCH may be transmitted.

As can be seen, current implementations of wireless communication systems are not enabled to handle concurrent transmissions of UCI and PUSCH of different priorities, such as multiplexing UCI and PUSCH of different priorities.

Various aspects of the present disclosure are directed to systems and methods for enabling a wireless network to provide UCI multiplexing on PUSCH transmissions. In particular, aspects of the present disclosure provide techniques and systems for multiplexing UCI and PUSCH transmissions of different priorities. In embodiments, a UE may be scheduled to transmit UCI and PUSCH (e.g., in accordance with a configured grant received from a base station) and the transmissions may overlap. In these embodiments, the UE may determine whether the UCI transmission and the PUSCH transmission may be multiplexed together or not. When the UCI transmission and the PUSCH transmission are allowed to be multiplexed together, the UE may multiplex the transmissions using a beta offset value selected from a set of beta-offset values configured based on the priority of the PUSCH and/or the priority of the UCI.

In embodiments, the determination of whether the UCI transmission and the PUSCH transmission may be multiplexed together or not may include determining whether UCI of different priorities may be multiplexed to the PUSCH. In some embodiments, the base station may configure, for each configured grant PUSCH, whether UCI of different priorities may be multiplexed to the configured grant PUSCH. For example, when the configured grant PUSCH is of a high priority, the configuration parameter from the base station may configure whether a low priority UCI may be multiplexed on the high priority PUSCH. In another example, when the configured grant PUSCH is of a low priority, the configuration parameter from the base station may configure whether a high priority UCI may be multiplexed on the high priority PUSCH.

In some aspects, when multiple PUSCH transmissions overlap a UCI transmission, the UE may multiplex the UCI to a PUSCH of the same priority in accordance with the configuration. In some embodiments, when multiple PUSCH transmissions overlap a UCI transmission of a particular priority, the UE may multiplex the UCI to a PUSCH that is configured to allow multiplexing of a UCI of the particular priority.

Figures 5, 6:
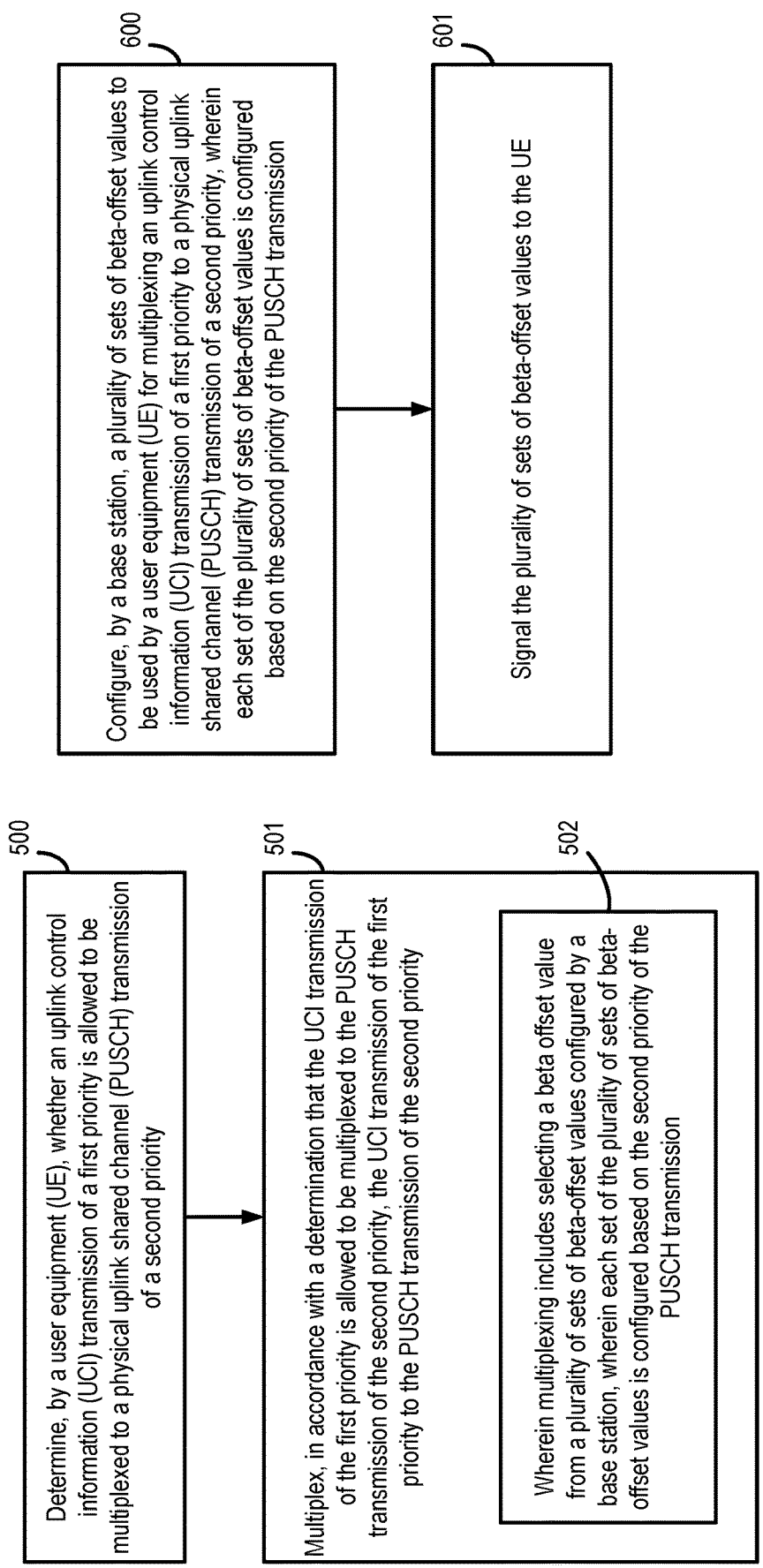
FIG. 5 is a block diagram illustrating example blocks executed to implement one aspect of the present disclosure.
FIG. 6 is a block diagram illustrating example blocks executed to implement one aspect of the present disclosure.
Figure 7:
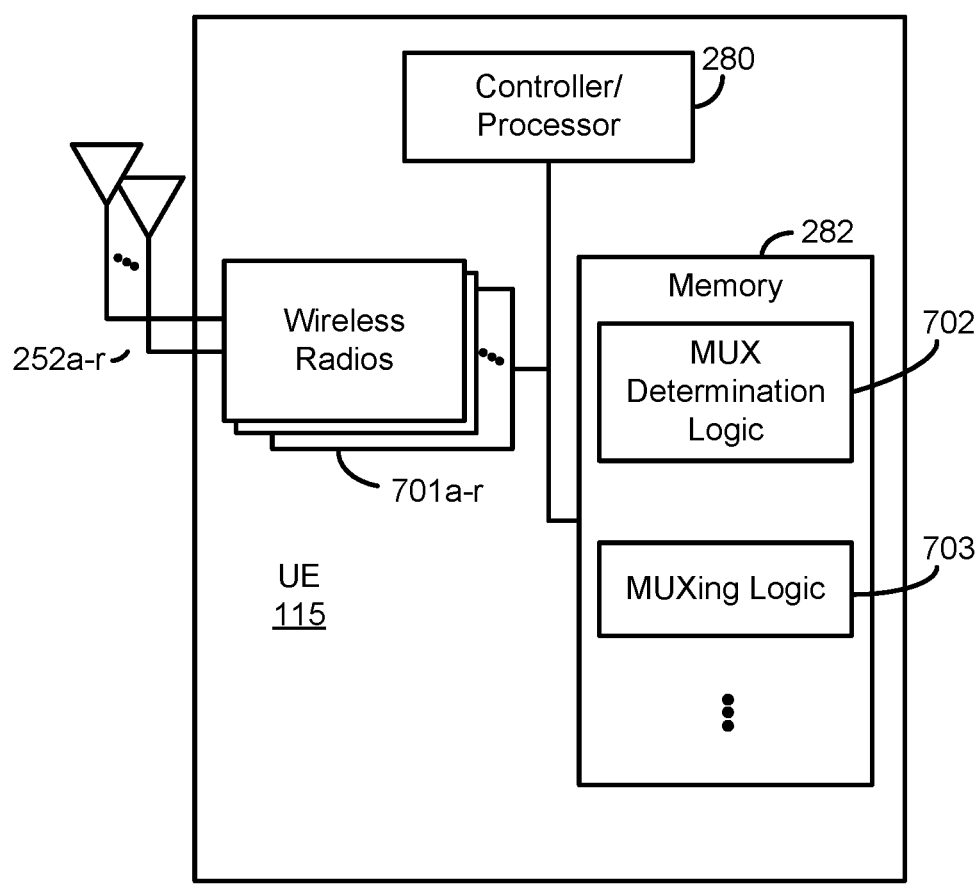
FIG. 7 is a block diagram conceptually illustrating a design of a UE configured according to some embodiments of the present disclosure.

FIG. 5 is a block diagram illustrating example blocks executed to implement one aspect of the present disclosure. The example blocks will also be described with respect to UE 115 as illustrated in FIG. 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701a-r and antennas 252a-r. Wireless radios 701a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UE determines whether a UCI transmission having a first priority is allowed or permitted to be multiplexed to a PUSCH transmission having a second priority. In order to implement the functionality for such operations, UE 115, under control of controller/processor 280, executes MUX determination logic 702, stored in memory 282. The functionality implemented through the execution environment of MUX determination logic 702 allows for UE 115 to perform UCI multiplexing determination operations according to the various aspects herein.

In embodiments, the UCI transmission and the PUSCH transmission may be transmissions scheduled to be transmitted by the UE to a serving base station. In embodiments, the transmissions are in response to a configured grant provided by the base station to the UE. In embodiment, the configured grant may be signaled to the UE by the base station in a configured grant message (e.g., a ConfiguredGrant information element) sent to the UE. The configured grant message may include parameters and elements defining different configuration parameter for PUSCH transmission by the UE.

In embodiments, the first priority (e.g., the priority of the UCI transmission) may be a high priority or a low priority. Similarly, the second priority (e.g., the priority of the PUSCH transmission) may be a high priority or a low priority. In some embodiments, the first priority and the second priority may be the same (e.g., either high or low priority) or may be different (e.g., low priority UCI and high priority PUSCH, or high priority UCI and low priority PUSCH).

In embodiments, determining whether the UCI transmission of the first priority is permitted to be multiplexed to the PUSCH transmission of the second priority may include making determinations as to whether a UCI multiplexing configuration of the UE indicates that a UCI of a first priority is allowed to be multiplexed to a PUSCH transmission of a second priority when the first priority and the second priority are different. In some embodiments, the base station may configure the UCI multiplexing configuration for the UE. For example, the base station may configure, for each configured grant PUSCH configuration, whether a UCI of a particular priority may be multiplexed to the PUSCH based on the priority of the PUSCH. The UCI multiplexing configuration of a the PUSCH of the second priority may specify that a UCI of a different priority may or may not be multiplexed to the PUSCH based on the priority of the PUSCH. For example, the UCI multiplexing configuration may specify that when the PUSCH has a high priority, a low priority UCI may be multiplexed to the PUSCH. On the other hand, the UCI multiplexing configuration may specify that when the PUSCH has a high priority, a low priority UCI may not be multiplexed to the high priority PUSCH. In embodiments, when the low priority UCI is not allowed to be multiplexed to the high priority PUSCH, the low priority UCI may be dropped.

In another example, the UCI multiplexing configuration may specify that when the PUSCH has a low priority, a high priority UCI may be multiplexed to the PUSCH. On the other hand, the UCI multiplexing configuration may specify that when the PUSCH has a low priority, a high priority UCI may not be multiplexed to the low priority PUSCH. In embodiments, when the high priority UCI is not allowed to be multiplexed to the low priority PUSCH, the UE may not use the PUSCH transmission to multiplex the low priority PUSCH.

In these example cases, the UCI of the first priority may be multiplexed to the PUSCH transmission of the second priority based on the UCI multiplexing configuration of the PUSCH transmission.

In some embodiments, the UCI multiplexing configuration may specify whether a UCI transmission of a particular priority is permitted to be multiplexed to a PUSCH transmission of a different priority for various types of UCI types individually. For example, in implementations, there may be various UCI types and UCI payload sizes. These UCI types and corresponding and payload sizes may include Hybrid Automatic Repeat Request (HARQ)-ACK with a payload size of <=2 bits, HARQ-ACK with a payload size of 3-11 bits, HARQ-ACK with a payload size of >11 bits, CSI part 1 with a payload size of <=11 bits, CSI part 1 with a payload size of >11 bits, CSI part 2 with a payload size of <=11 bits, and CSI part 2 with a payload size of >11 bits.

In embodiments, the base station may configure the UCI multiplexing parameters for each UCI type individually. For example, the base station may configure a high priority configured grant PUSCH transmission to permit a low priority HARQ-ACK UCI to be multiplexed to a high priority PUSCH transmission. However, the base station may configure the high priority configured grant PUSCH transmission to not permit a low priority CSI part 1 UCI to be multiplexed to the high priority PUSCH transmission. In this manner, the disclosed aspects provide an advantageous and more granular approach to determining whether a UCI transmission of a particular priority may be allowed to be multiplexed to a PUSCH transmission of a different priority.

In some embodiments, the base station may signal the UCI multiplexing configuration to the UE via a radio resource control (RRC) parameter that indicates whether multiplexing of the UCI transmission to the PUSCH transmission is allowed when the first priority and the second priority are different, and may specify the situations where the UCI of a different is allowed. In embodiments, the RRC message may include an indication of whether the UCI of different priority may be multiplexed for each individual UCI type and/or payload size, as described above.

In some embodiments, the UCI transmission of the first priority may overlap (e.g., in the time domain) multiple PUSCH transmissions. In these embodiments, each PUSCH transmission may be a configured grant PUSCH transmission of a particular priority or a dynamic grant PUSCH of a particular priority. In these embodiments, determining whether the UCI transmission of the first priority is permitted to be multiplexed to the PUSCH transmission of the second priority may include determining whether the UCI is permitted to be multiplexed to any of the multiple PUSCH transmissions based on the priorities of the PUSCH transmissions.

In particular embodiments, a UCI transmission of a first priority may be permitted to be multiplexed to a PUSCH transmission (e.g., of the multiple overlapping PUSCH transmissions) of the same priority. In this case, determining whether the UCI transmission of the first priority is permitted to be multiplexed to the PUSCH transmission of the second priority may include determining, e.g., by the UE, which of the PUSCH transmissions of the multiple overlapping PUSCH transmissions have a different priority from the UCI transmission (e.g., the first transmission). Those PUSCH transmissions of the multiple overlapping PUSCH transmissions that are determined have a different priority from the UCI transmission may be disregarded or ignored by the UE for UCI multiplexing. For example, the UE may not consider those different priority PUSCH transmissions for UCI multiplexing. In embodiments, the UE may not drop those disregarded PUSCH transmissions but may transmit them even when the UCI transmission is not multiplexed on the PUSCH transmission.

In embodiments, if there are no remaining PUSCH transmissions to consider (e.g., none of multiple overlapping PUSCH transmissions have a same priority as the UCI transmission), the UCI transmission or the PUSCH transmissions may be dropped. For example, a low priority UCI transmission may be dropped when all PUSCH transmissions are of high priority. As another example the PUSCH transmissions may be dropped if all PUSCH transmissions are of low priority, and the UCI is of a high priority. However, remaining PUSCH transmissions of the plurality of PUSCH transmissions, e.g., PUSCH transmissions having a same priority as the priority of the UCI transmission may be considered for UCI multiplexing. In this case, the UE may make a determination as to which of the PUSCH transmissions having a same priority as the priority of the UCI transmission may be used to multiplex the UCI transmission. In embodiments, determining which of the PUSCH transmissions (of the multiple overlapping PUSCH transmissions) having a same priority as the priority of the UCI transmission may be used to multiplex the UCI transmission may include determining a cell index for each of the cells to which the multiple PUSCH transmissions overlapping the UCI are being transmitted, and identifying the PUSCH with the lowest cell index. In embodiments, the PUSCH transmission (e.g., having a same priority as the priority of the UCI transmission) associated with the cell with the lowest may be selected for multiplexing the UCI transmission.

In embodiments, when multiple PUSCH transmissions are scheduled in the cell with the lowest cell index, the UE may determine which of the multiple PUSCH transmissions scheduled in the cell with the lowest cell number has the earliest schedule time. The PUSCH transmission (e.g., having a same priority as the priority of the UCI transmission) having the earliest scheduled time may be selected for multiplexing the UCI transmission.

In particular embodiments, such as when the UCI transmission of the first priority may overlap (e.g., in the time domain) multiple PUSCH transmissions, determining whether the UCI is permitted to be multiplexed to any of the multiple PUSCH transmissions based on the priorities of the PUSCH transmissions may include determining whether the configuration of the PUSCH transmissions allows multiplexing of a UCI of a particular priority (e.g., the first priority). In these embodiments, the UE may determine which of the PUSCH transmissions of the multiple overlapping PUSCH transmissions have a UCI multiplexing configuration that allows a UCI of the first priority to be multiplexed to the PUSCH transmission. In embodiments, those PUSCH transmissions of the multiple overlapping PUSCH transmissions that are determined to have a configuration that does not permit a UCI transmission of a first priority to be multiplexed to the PUSCH transmission may be disregarded or ignored by the UE for UCI multiplexing. For example, the UE may not consider those PUSCH transmissions for UCI multiplexing. In embodiments, the UE may not drop those disregarded PUSCH transmissions but may transmit them even when the UCI transmission is not multiplexed on the PUSCH transmission.

In embodiments, if there are no remaining PUSCH transmissions to consider (e.g., none of multiple overlapping PUSCH transmissions allow multiplexing of a UCI transmission of the first priority), the UCI transmission or the PUSCH transmissions may be dropped. For example, a low priority UCI transmission may be dropped when all PUSCH transmissions are of high priority. As another example, all the PUSCH transmissions may be dropped if the UCI is of high priority, and/or when all PUSCH transmissions are of low priority, none of those PUSCH transmissions may be used to multiplex a high priority UCI. However, remaining PUSCH transmissions of the plurality of PUSCH transmissions, e.g., PUSCH transmissions that are determined to have a configuration that permits a UCI transmission of a first priority to be multiplexed to the PUSCH transmission may be considered for UCI multiplexing. In this case, the UE may make a determination as to which of the PUSCH transmissions allowing a UCI transmission of a first priority to be multiplexed to the PUSCH transmission may be used to multiplex the UCI transmission.

In embodiments, determining which of the PUSCH transmissions (of the multiple overlapping PUSCH transmissions) having a configuration that permits a UCI transmission of a first priority to be multiplexed to the PUSCH transmission may be used to multiplex the UCI transmission may include determining a cell index for each of the cells to which the multiple PUSCH transmissions overlapping the UCI are being transmitted, and identifying the PUSCH with the lowest cell index. In embodiments, the PUSCH transmission (e.g., having a configuration that permits a UCI transmission of a first priority to be multiplexed to the PUSCH transmission) associated with the cell with the lowest may be selected for multiplexing the UCI transmission.

In embodiments, when multiple PUSCH transmissions are scheduled in the cell with the lowest cell index, the UE may determine which of the multiple PUSCH transmissions scheduled in the cell with the lowest cell number has the earliest schedule time. The PUSCH transmission (e.g., having a configuration that permits a UCI transmission of a first priority to be multiplexed to the PUSCH transmission) having the earliest scheduled time may be selected for multiplexing the UCI transmission.

At block 501, the UE multiplexes the UCI transmission of the first priority to the PUSCH transmission of the second priority in accordance with a determination that the UCI transmission of the first priority is allowed to be multiplexed to the PUSCH transmission of the second priority. In order to implement the functionality for such operations, UE 115, under control of controller/processor 280, executes MUXing logic 703, stored in memory 282. The functionality implemented through the execution environment of MUXing logic 703 allows for UE 115 to perform UCI multiplexing operations according to the various aspects herein.

In embodiments, when the UE determines that a UCI transmission of the first priority is not allowed to be multiplexed to a PUSCH transmission of the second priority, the UE may forgo multiplexing the UCI transmission of the first priority to the PUSCH transmission of the second priority. In some embodiments, the UCI transmission may be dropped. In alternative or additional embodiments, another PUSCH transmission (e.g., another PUSCH transmission having a different UCI multiplexing configuration or a different priority from the second priority) may be considered for multiplexing the UCI of the first priority. In the latter case, a determination may be made as to whether the UCI is permitted to be multiplexed to the another PUSCH transmission in accordance with the description above.

In embodiments, multiplexing the UCI to the PUSCH transmission may include using a beta-offset value for the multiplexing operations. A beta-offset may be a parameter that is used by a UE to scale down the spectrum efficiency of a UCI, such as with respect to a spectrum efficiency of data, when the UCI is multiplexed to a PUSCH transmission. Scaling down the spectrum efficiency of the UCI using the beta-offset may serve to provide higher reliability for the UCI transmission relative to the data transmission in the PUSCH.

For example, when the UCI transmission that is to be multiplexed to the PUSCH transmission includes HARQ-ACK, Equation 1 may be used to determine a number of resources elements (REs) that may be assigned to the HARQ-ACK. As Equation 1 shows, beta-offset ($\beta_{offset}^{PUSCH}$) may be used to scale down the HARQ-ACK spectrum efficiency.

Equation 1

$$Q'_{ACK} = \min\left\{\left\lceil\frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \left\lceil\alpha \cdot \sum_{l=l_0}^{N_{symb,all}^{PUSCH}-1} M_{sc}^{UCI}(l)\right\rceil\right\},$$

where O may the number of HARQ-ACK bits, $$N_{symb,all}^{PUSCH} - 1$$

may be the number of SC-FDMA symbols per subframe for the UCI transmission, $$C_{UL-SCH} - 1$$

maybe the total number of code blocks for UL-SCH, $M_{SC}^{UCI}$ may be the number of subcarriers (e.g., resource Sc elements) in each OFDM symbol that are available for transmitting the UCI, $K_r$ is the number of bits for the code block number r, and $L_{ACK}$ is the number of CRC bits.

As will be appreciated, a larger beta-offset results in a lower UCI spectrum efficiency. In this case, with a lower spectrum efficiency, more REs may be occupied by the UCI in the PUSCH, which results in a more reliable UCI transmission, but which has a larger impact on the PUSCH transmission performance.

In order to provide flexibility when multiplexing UCI to PUSCH with respect to performance balancing, different beta-offset values are used for the different types of UCI. The different types of UCI are described above, but include HARQ-ACK with a payload size of <=2 bits, HARQ-ACK with a payload size of 3-11 bits, HARQ-ACK with a payload size of >11 bits, CSI part 1 with a payload size of <=11 bits, CSI part 1 with a payload size of >11 bits, CSI part 2 with a payload size of <=11 bits, and CSI part 2 with a payload size of >11 bits.

In embodiments, the beta-offset value offset used by the UE to multiplex the UCI to the PUSCH may be selected from a set of beta-offset values. In aspects, the set of beta-offset values may be signaled by the base station to the UE. For example, a configured grant message (e.g., a ConfiguredGrant information element) may be sent from the base station to the UE. The configured grant message may include an indication of a set or sets of beta-offset values from which the UE may select the beta-offset value to be used to multiplex the UCI to the PUSCH transmission.

Figure 4A:
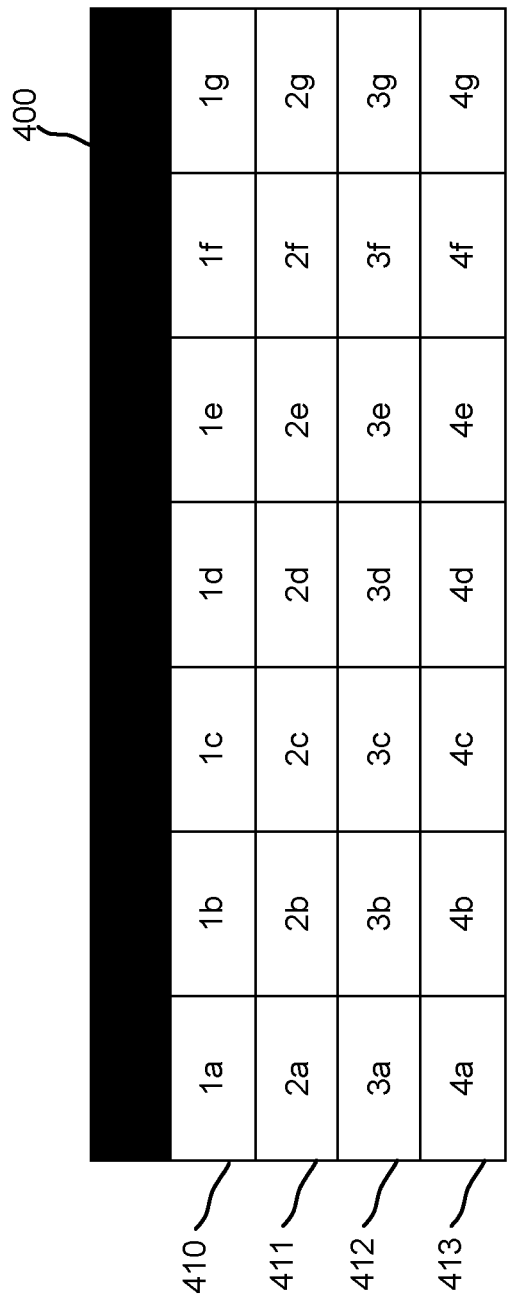
FIG. 4A is a diagram illustrating sets of beta-offset in accordance with aspects of the present disclosure.

In some embodiments, a set of beta-offset values may include up to seven (7) beta-offset values. For example, a set of beta-offset values may include a value for each of the types of UCI. For example, FIG. 4A is a diagram illustrating sets of beta-offset in accordance with aspects of the present disclosure. As shown in FIG. 4A, sets 410-413 may each represent a set of beta-offset values. A-G may represent the various types of UCI A-G (e.g., HARQ-ACK with a payload size of <=2 bits, HARQ-ACK with a payload size of 3-11 bits, HARQ-ACK with a payload size of >11 bits, CSI part 1 with a payload size of <=11 bits, CSI part 1 with a payload size of >11 bits, CSI part 2 with a payload size of <=11 bits, and CSI part 2 with a payload size of >11 bits, respectively). In embodiments, the base station may configure (and indicate) to the UE one set of up to seven offset values. For example, the base station may configure and indicate to the UE set 410. Set 410 may include beta-offset values 1*a-g* corresponding to the various types of UCI types (represented by A-G, respectively). The UE may select a beta-offset value (e.g., from 1*a-g*) from the configured set 410, depending on which type UCI (e.g., A-G) is being multiplexed to the PUSCH. This may be referred to herein as a semi-static beta-offset indication.

In some embodiments, the base station may configure (and indicate) to the UE four (4) sets of beta-offset values, with up to seven offset-values in each set. For example, as also shown in FIG. 4A, a base station may configure (and indicate) to the UE all sets 410-413. The UE may select a set from sets 410-413, and then a beta-offset value from the selected set, depending on which type UCI (e.g., A-G) is being multiplexed to the PUSCH. This may be referred to herein as a dynamic beta-offset indication.

In aspects of the present disclosure, multiplexing the UCI of the first priority to the PUSCH transmission of the second priority may include selecting, at block 502, by the UE, a beta-offset value used to multiplex the UCI of the first priority and the PUSCH of the second priority. In embodiments, the beta-offset value may be selected from a plurality of sets of beta-offset values configured by the base station. In embodiments, each set of the plurality of sets of beta-offset values may configured based on the priority of the PUSCH transmission (e.g., the second priority) and/or the priority of the UCI transmission (e.g., the first priority).

It is noted that in some implementations of wireless networks, two ways of scheduling PUSCH transmissions are implemented. One type is a dynamic scheduling using a dynamic grant, and another type using a semi-static/semi-persistent scheduling using a configured grant. Aspects of the present disclosure discussed below with respect to configuration of multiple sets of beta-offset values are described within the context of a configured grant PUSCH transmission. For configured grant PUSCH transmissions, the base station may configure a set of parameters for the UE to use in order to schedule and perform the PUSCH transmission. In aspects of the present disclosure, the base station may configure at least two sets of beta-offset values as part of the configuration of the configured grant.

FIGS. 4B-4E show examples of pluralities of sets of beta-offset values that may be configured by the base station for use by the UE. In embodiments, the sets of beta-offset values that may configured by the base station may be based on the priority of the PUSCH transmission (e.g., the second priority) and/or the priority of the UCI transmission (e.g., the first priority).

For example, in embodiments, the PUSCH transmission may have one of two priorities, high or low. Similarly, the UCI may have one of two priorities, high or low. As such, there may be four scenarios that a UE may encounter when multiplexing UCI of a first priority to a PUSCH transmission of second priority, which are as follows:

1) Low priority PUSCH, low priority UCI.
2) High priority PUSCH, low priority UCI.
3) Low priority PUSCH, high priority UCI.
4) High priority PUSCH, high priority UCI.

In embodiments, the base station may configure a plurality of sets of beta-offset values to be used by a UE in multiplexing operations based on the priority of the PUSCH transmission and/or the priority of the UCI transmission. For example, when the configured grant PUSCH transmission is high priority, a base station may configure at least two sets of beta-offset values as part of the configuration for a configured grant PUSCH, one set for scenario 2 and another set for scenario 4. Similarly, when the PUSCH transmission is low priority, a base station may configure at least two sets of beta-offset values, one set for scenario 1 and another set for scenario 3. In some embodiments, the determination of which beta-offset values to select may be based on the priority of the UCI. For example, when the UCI transmission is high priority, a base station may configure at least two sets of beta-offset values, one set for scenario 3 and another set for scenario 4. Similarly, when the UCI transmission is low priority, a base station may configure at least two sets of beta-offset values, one set for scenario 1 and another set for scenario 3.

In aspects, each plurality 400-403 of sets of beta-offset values shown in FIGS. 4B-4E may correspond to a different scenario described above (e.g., scenarios 1-4). For example, in aspects, plurality of sets 400 may be configured by the base station for scenario 1, when the PUSCH is low priority and the UCI is low priority. In aspects, plurality of sets 401 may be configured by the base station for scenario 2, when the PUSCH is high priority and the UCI is low priority. In aspects, plurality of sets 402 may be configured by the base station for scenario 3, when the PUSCH is low priority and the UCI is high priority. In aspects, plurality of sets 403 may be configured by the base station for scenario 4, when the PUSCH is high priority and the UCI is high priority.

In embodiments, each plurality 400-403 of sets of beta-offset values may include either one set of up to seven beta-offset values, such as when the base station uses semi-static beta-offset indication, or may include 4 sets of 7 beta-offset values (a total 28 beta-offset values), such as when the base station uses dynamic beta-offset indication, in accordance with the above description with respect to FIG. 4A.

Figure 8:
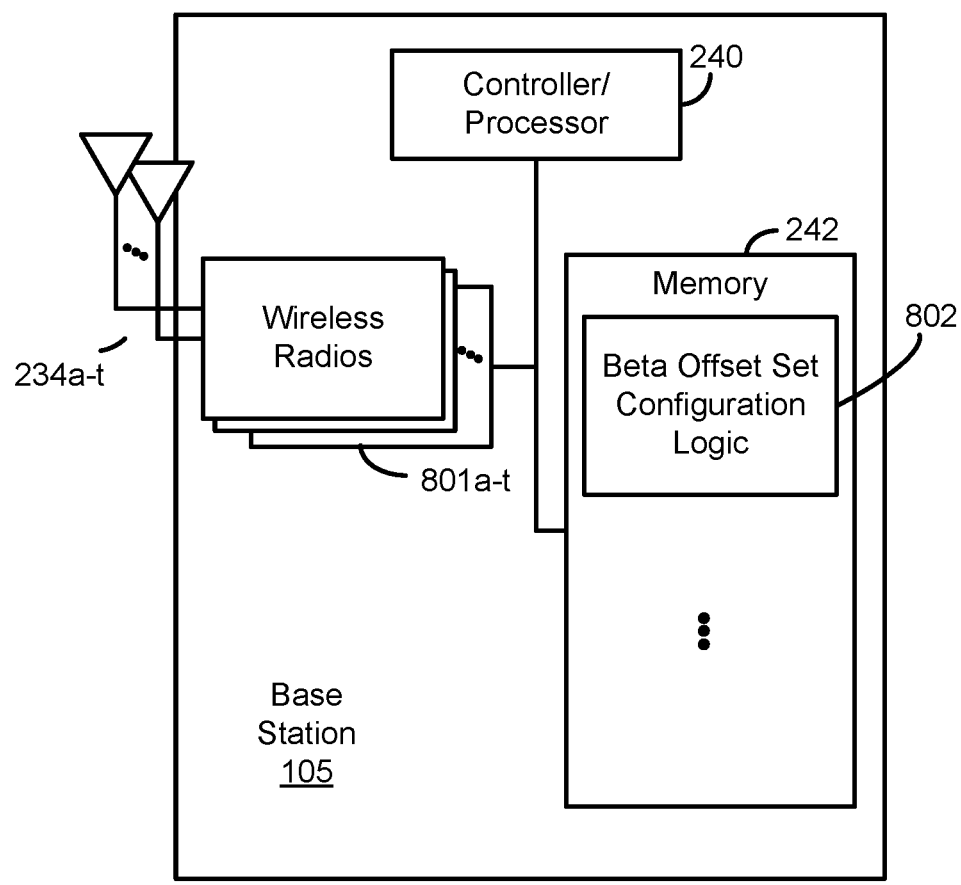
FIG. 8 is a block diagram conceptually illustrating a design of a base station configured according to some embodiments of the present disclosure.

FIG. 6 is a block diagram illustrating example blocks executed to implement one aspect of the present disclosure. The example blocks will also be described with respect to base station 105 as illustrated in FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 801*a-t* and antennas 234*a-t*. Wireless radios 801*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 600, a base station (e.g., base station 105) configures a plurality of sets of beta-offset values to be used by a UE for multiplexing a UCI transmission of a first priority to a PUSCH transmission of a second priority. In order to implement the functionality for such operations, base station 105, under control of controller/processor 240, executes beta-offset set configuration logic 802, stored in memory 242. The functionality implemented through the execution environment of beta-offset set configuration logic 802 allows for base station 105 to perform beta-offset set configuration operations according to the various aspects herein.

In embodiments, each set of the plurality of sets of beta-offset values may be configured by the base station based on the priority of the PUSCH transmission and/or the priority of the UCI transmission. For example, the base station may configure the plurality of sets of beta-offset values may be configured by the base station based on the priority of the PUSCH transmission and/or the priority of the UCI transmission in accordance with the description above with respect to FIGS. 4B-4E and with respect to scenarios 1-4.

In particular, a base station may configure a plurality of sets of beta-offset values to be used by a UE in multiplexing operations based on the priority of the PUSCH transmission and/or the priority of the UCI transmission. For example, when the PUSCH transmission is high priority, a base station may configure at least two sets of beta-offset values, one set for scenario 2 and anther set for scenario 4. Similarly, when the PUSCH transmission is low priority, a base station may configure at least two sets of beta-offset values, one set for scenario 1 and anther set for scenario 3. In some embodiments, the determination of which beta-offset values to select may be based on the priority of the UCI. For example, when the UCI transmission is high priority, a base station may configure at least two sets of beta-offset values, one set for scenario 3 and anther set for scenario 4. Similarly, when the UCI transmission is low priority, a base station may configure at least two sets of beta-offset values, one set for scenario 1 and anther set for scenario 3.

As described above, the sets configured for each scenario may correspond to plurality of sets 400-403 illustrated in FIGS. 4B-4E, and may include either one set of up to seven beta-offset values, such as when the base station uses semi-static beta-offset indication, or may include 4 sets of 7 beta-offset values (a total 28 beta-offset values), such as when the base station uses dynamic beta-offset indication.

At block 601, the base station signals the plurality of sets of beta-offset values to the UE. For example, the bases station (e.g., base station 105) engaged in communications with a UE, may signal the plurality of sets of beta-offset values to the UE via antennas 234a-t and wireless radios 801a-t. In embodiments, signaling the plurality of sets of beta-offset values to the UE may include transmitting an RRC message to the UE indicating which sets may be used.

In some embodiments, the base station may also configure the UE, e.g., via control information such as DCI, or via transmission grant, to either allow or deny multiplexing of the UCI transmission to the PUSCH transmission when the first priority and the second priority are different. In some embodiments, the configuration to either allow or deny multiplexing of the UCI transmission to the PUSCH transmission when the first priority and the second priority are different may be individual for each type of UCI, as described above.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5 and 6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a user equipment (UE), whether an uplink control information (UCI) transmission of a first priority is allowed to be multiplexed to a physical uplink shared channel (PUSCH) transmission of a second priority; and
   multiplexing, in accordance with a determination that the UCI transmission of the first priority is allowed to be multiplexed to the PUSCH transmission of the second priority, the UCI transmission of the first priority to the PUSCH transmission of the second priority, wherein multiplexing includes:
      selecting a beta offset value from a plurality of sets of beta-offset values configured by a base station for multiplexing the UCI transmission of the first priority to the PUSCH transmission of the second priority, wherein each set of the plurality of sets of beta-offset values is configured based at least in part on the second priority of the PUSCH transmission.

2. The method of claim 1, further comprising:
   foregoing, in accordance with a determination that the UCI transmission of the first priority is not allowed to be multiplexed to the PUSCH transmission of the second priority, multiplexing the UCI transmission of the first priority to the PUSCH transmission of the second priority.

3. The method of claim 2, wherein the first priority is a low priority and the second priority is a high priority, and wherein foregoing multiplexing the low priority UCI transmission to the high priority PUSCH transmission includes dropping the low priority UCI transmission.

4. The method of claim 1, wherein selecting the beta offset value from the plurality of sets of beta-offset values configured by the base station includes selecting the beta offset from:
   a first set of beta offsets configured to be used by the UE when the first priority is a low priority and the second priority is the low priority;
   a second set of beta offsets configured to be used by the UE when the first priority is the low priority and the second priority is a high priority;
   a third set of beta offsets configured to be used by the UE when the first priority is the high priority and the second priority is the low priority; and
   a fourth set of beta offsets configured to be used by the UE when the first priority is the high priority and the second priority is the high priority.

5. The method of claim 4, wherein the PUSCH transmission is a configured grant PUSCH transmission, and wherein at least one of the first set, the second set, the third set, and the fourth set is configured in a configuration of the configured grant PUSCH transmission.

6. The method of claim 5, wherein the configured grant PUSCH transmission is of low priority, and wherein the plurality of sets of beta-offset values configured by the base station includes two sets of beta-offset values for the configured grant PUSCH, the two sets of beta-offset values including:
   a set of beta-offset values configured to be used by the UE when the first priority is the low priority and the second priority is the low priority; and
   another set of beta-offset values configured to be used by the UE when the first priority is the high priority and the second priority is the low priority.

7. The method of claim 5, wherein the configured grant PUSCH transmission is of high priority, and wherein the plurality of sets of beta-offset values configured by the base station includes two sets of beta-offset values for the configured grant PUSCH, the two sets of beta-offset values including:
   a set of beta-offset values configured to be used by the UE when the first priority is the low priority and the second priority is the high priority; and
   another set of beta-offset values configured to be used by the UE when the first priority is the high priority and the second priority is the high priority.

8. The method of claim 5, wherein determining whether the UCI transmission of the first priority is allowed to be multiplexed to the PUSCH transmission of the second priority includes determining whether the configuration of the configured grant PUSCH transmission allows multiplexing the UCI transmission to the PUSCH transmission when the first priority and the second priority are different.

9. The method of claim 5, wherein the configuration of the configured grant PUSCH transmission includes individual configuration of whether multiplexing of the UCI transmission to the PUSCH transmission is allowed for each of a plurality of UCI types.

10. The method of claim 1, wherein the base station configures the plurality of sets of beta-offset values via a semi-static indication, and wherein each set of the plurality of sets of beta-offset values includes seven or less beta offset values.

11. The method of claim 10, wherein each beta offset value of the seven or less beta offset values corresponds to a different type of UCI or to UCI of different payload sizes.

12. The method of claim 1, wherein the base station configures the plurality of sets of beta-offset values via a dynamic indication, and wherein each set of the plurality of sets of beta-offset values includes four subsets of seven or less beta offset values.

13. The method of claim 12, wherein each beta offset value of the seven or less beta offset values in each of the four subsets corresponds to a different type of UCI or to UCI of different payload sizes.

14. The method of claim 1, wherein the UE determines that the UCI transmission of the first priority is allowed to be multiplexed to the PUSCH transmission of the second priority, and wherein a plurality of PUSCH transmissions overlap the UCI transmission of the first priority, the plurality of PUSCH transmissions including the PUSCH transmission of the second priority.

15. The method of claim 14, wherein multiplexing the UCI transmission of the first priority to the PUSCH transmission of the second priority includes:
    selecting the PUSCH transmission of the second priority from the plurality of PUSCH transmissions based on the second priority being the same as the first priority.

16. The method of claim 15, wherein selecting the PUSCH transmission of the second priority from the plurality of PUSCH transmissions based on the second priority being the same as the first priority includes:
    disregarding PUSCH transmissions of the plurality of PUSCH transmissions having a different priority than the first priority.

17. The method of claim 16, wherein selecting the PUSCH transmission of the second priority from the plurality of PUSCH transmissions based on the second priority being the same as the first priority includes:
    identifying PUSCH transmissions of the plurality of PUSCH transmissions having a same priority as the first priority;
    identifying PUSCH transmissions with a lowest cell index from the PUSCH transmissions of the plurality of PUSCH transmissions having a same priority as the first priority; and
    selecting the PUSCH transmission of the second priority from the PUSCH transmissions with a lowest cell index.

18. The method of claim 17, wherein selecting the PUSCH transmission of the second priority from the PUSCH transmissions with a lowest cell index includes:
    selecting a PUSCH transmission having an earliest scheduled time from the PUSCH transmissions with a lowest cell index; and
    selecting the PUSCH transmission having the earliest scheduled time as the PUSCH transmission of the second priority.

19. The method of claim 14, wherein multiplexing the UCI transmission of the first priority to the PUSCH transmission of the second priority includes:
    selecting the PUSCH transmission of the second priority from the plurality of PUSCH transmissions based on a configuration of the PUSCH transmission of the second priority, the configuration of the PUSCH transmission of the second priority indicating that a UCI of a same priority as the second priority is allowed to be multiplexed to the PUSCH transmission of the second priority.

20. The method of claim 19, wherein selecting the PUSCH transmission of the second priority from the plurality of PUSCH transmissions based on the configuration of the PUSCH transmission of the second priority includes:
    disregarding PUSCH transmissions of the plurality of PUSCH transmissions whose configuration indicates that a UCI of a same priority as the second priority is not allowed to be multiplexed to the PUSCH transmission of the second priority.

21. The method of claim 20, wherein selecting the PUSCH transmission of the second priority from the plurality of PUSCH transmissions based on the configuration indicating that a UCI of the same priority as the second priority is not allowed to be multiplexed to the PUSCH transmission of the second priority includes:
    identifying PUSCH transmissions of the plurality of PUSCH transmissions whose configuration indicates that a UCI of the same priority as the second priority is not allowed to be multiplexed to the PUSCH transmission of the second priority;
    identifying PUSCH transmissions with a lowest cell index from the PUSCH transmissions of the plurality of PUSCH transmissions whose configuration indicates that a UCI of the same priority as the second priority is not allowed to be multiplexed to the PUSCH transmission of the second priority; and
    selecting the PUSCH transmission of the second priority from the PUSCH transmissions with a lowest cell index.

22. The method of claim 21, wherein selecting the PUSCH transmission of the second priority from the PUSCH transmissions with a lowest cell index includes:
    selecting a PUSCH transmission having an earliest scheduled time from the PUSCH transmissions with a lowest cell index; and
    selecting the PUSCH transmission having the earliest scheduled time as the PUSCH transmission of the second priority.

23. A method of wireless communication, comprising:
    configuring, by a base station, a plurality of sets of beta-offset values to be used by a user equipment (UE) for multiplexing an uplink control information (UCI) transmission of a first priority to a physical uplink shared channel (PUSCH) transmission of a second priority, wherein each set of the plurality of sets of beta-offset values is configured based at least in part on the second priority of the PUSCH transmission; and
    signaling the plurality of sets of beta-offset values to the UE.

24. The method of claim 23, configuring the plurality of sets of beta-offset values includes configuring:
    a first set of beta offsets configured to be used by the UE when the first priority is a low priority and the second priority is the low priority;
    a second set of beta offsets configured to be used by the UE when the first priority is the low priority and the second priority is a high priority;

a third set of beta offsets configured to be used by the UE when the first priority is the high priority and the second priority is the low priority; and a fourth set of beta offsets configured to be used by the UE when the first priority is the high priority and the second priority is the high priority.

25. The method of claim 23, wherein configuring the plurality of sets of beta-offset values includes configuring the plurality of sets of beta-offset values via a semi-static indication, and wherein each set of the plurality of sets of beta-offset values includes seven or less beta offset values, and wherein each beta-offset value of the seven or less beta offset values corresponds to a different type of UCI or to UCI of different payload sizes.

26. The method of claim 23, wherein configuring the plurality of sets of beta-offset values includes configuring the plurality of sets of beta-offset values via a dynamic indication, and wherein each set of the plurality of sets of beta-offset values includes four subsets of seven or less beta-offset values, and wherein each beta-offset value of the seven or less beta-offset values in each of the four subsets corresponds to a different type of UCI or to UCI of different payload sizes.

27. The method of claim 23, further comprising:
configuring, by the base station, the UE to one of allow or deny multiplexing of the UCI transmission to the PUSCH transmission when the first priority and the second priority are different.

28. The method of claim 27, wherein configuring the UE to one of allow or deny multiplexing includes:
configuring the UE to one of allow or deny multiplexing of the UCI transmission to the PUSCH transmission for each of a plurality of UCI types, wherein configuring the UE to one of allow or deny multiplexing of the UCI transmission to the PUSCH transmission for each of the plurality of UCI types includes one or more of:
sending a radio resource control (RRC) parameter to the UE, the RRC parameter indicating whether multiplexing of the UCI transmission to the PUSCH transmission is allowed when the first priority and the second priority are different; and
indicating whether multiplexing of the UCI transmission to the PUSCH transmission is allowed when the first priority and the second priority are different in a configuration of a configured grant of a physical uplink channel (PUSCH) transmission granted to the UE.

29. An apparatus comprising:
a processor; and
a memory coupled with the processor, wherein the memory includes instructions executable by the processor to cause the apparatus to perform operations including:
determining, by a user equipment (UE), whether an uplink control information (UCI) transmission of a first priority is allowed to be multiplexed to a physical uplink shared channel (PUSCH) transmission of a second priority; and
multiplexing, in accordance with a determination that the UCI transmission of the first priority is allowed to be multiplexed to the PUSCH transmission of the second priority, the UCI transmission of the first priority to the PUSCH transmission of the second priority, wherein multiplexing includes:
selecting a beta offset value from a plurality of sets of beta-offset values configured by a base station for multiplexing the UCI transmission of the first priority to the PUSCH transmission of the second priority, wherein each set of the plurality of sets of beta-offset values is configured based at least in part on the second priority of the PUSCH transmission.

30. An apparatus comprising:
a processor; and
a memory coupled with the processor, wherein the memory includes instructions executable by the processor to cause the apparatus to perform operations including:
configuring, by a base station, a plurality of sets of beta-offset values to be used by a user equipment (UE) for multiplexing an uplink control information (UCI) transmission of a first priority to a physical uplink shared channel (PUSCH) transmission of a second priority, wherein each set of the plurality of sets of beta-offset values is configured based at least in part on the second priority of the PUSCH transmission; and
signaling the plurality of sets of beta-offset values to the UE.

* * * * *